(12) United States Patent
Yang et al.

(10) Patent No.: US 11,239,966 B2
(45) Date of Patent: Feb. 1, 2022

(54) DEVICES AND METHODS FOR FACILITATING DMRS SEQUENCE GROUPING

(71) Applicant: QUALCOMM Incorporated, San Diego, CA (US)

(72) Inventors: Wei Yang, San Diego, CA (US); Yi Huang, San Diego, CA (US); Gokul Sridharan, Sunnyvale, CA (US); Peter Gaal, San Diego, CA (US); Xiao Feng Wang, San Diego, CA (US); Wanshi Chen, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/747,473

(22) Filed: Jan. 20, 2020

(65) Prior Publication Data
US 2020/0235878 A1 Jul. 23, 2020

Related U.S. Application Data

(60) Provisional application No. 62/796,006, filed on Jan. 23, 2019, provisional application No. 62/806,467, filed on Feb. 15, 2019.

(51) Int. Cl.
*H04L 5/00* (2006.01)
*H04W 72/12* (2009.01)
*H04L 27/18* (2006.01)

(52) U.S. Cl.
CPC ............ *H04L 5/0048* (2013.01); *H04L 27/18* (2013.01); *H04W 72/12* (2013.01)

(58) Field of Classification Search
None
See application file for complete search history.

(56) References Cited

U.S. PATENT DOCUMENTS

| 2015/0180625 | A1* | 6/2015 | Park | H04W 72/042 |
| | | | | 370/329 |
| 2019/0174466 | A1* | 6/2019 | Zhang | H04W 72/042 |

(Continued)

OTHER PUBLICATIONS

CATT: "Remaining Details on NR PBCH", 3GPP Draft, R1-1717798, 3GPP TSG RAN WG1 Meeting 90bis, 3rd Generation Partnership Project (3GPP), Mobile Competence Centre, 650, Route Des Lucioles, F-06921 Sophia-Antipolis Cedex, France vol. RAN WG1, No. Prague, CZ, Oct. 9, 2017-Oct. 13, 2017, Oct. 3, 2017 (Oct. 3, 2017), XP051352753, 6 Pages, Retrieved from the Internet: URL: http://www.3gpp.org/ftp/tsg_ran/WG1_RL1/TSGR1_90b/Docs/ [retrieved on Oct. 3, 2017] p. 1.

(Continued)

*Primary Examiner* — Diane L Lo
(74) *Attorney, Agent, or Firm* — Loza & Loza, LLP

(57) ABSTRACT

Wireless communications devices and methods are adapted to facilitate DMRS sequence grouping. In one example, information is obtained for a transmission scheduled with pi/2 BPSK modulation, the transmission including two or more symbols scheduled for a DMRS (DMRS symbols). Respective DMRS sequences may be identified for each of the DMRS symbols, where each DMRS sequence subsequent to another DMRS sequence is dependent on its immediately preceding DMRS sequence, and the transmission may be sent with the identified DMRS sequences in the two or more DMRS symbols. In one example, a first transmission may be sent to schedule a second transmission from another device with pi/2 BPSK modulation, where the second transmission includes two or more DMRS symbols. The scheduled second transmission may be received with at (Continued)

least one DMRS symbol including a DMRS sequence based on its immediately preceding DMRS sequence. Other aspects, embodiments, and features are also included.

30 Claims, 10 Drawing Sheets

(56) References Cited

U.S. PATENT DOCUMENTS

| | | | |
|---|---|---|---|
| 2020/0162228 A1* | 5/2020 | Gao | H04L 5/0051 |
| 2020/0178287 A1 | 6/2020 | Kim et al. | |
| 2020/0204315 A1* | 6/2020 | Zhao | H04L 5/0091 |
| 2020/0228299 A1* | 7/2020 | Chou | H04L 27/32 |
| 2021/0091904 A1* | 3/2021 | Matsumura | H04W 72/04 |

OTHER PUBLICATIONS

Intel Corporation: "Low PAPR Reference signals", 3GPP Draft, R1-1900503, 3GPP TSG RAN WG1 Ad-Hoc Meeting 1901, Low PAPR Reference Signals, 3rd Generation Partnership Project (3GPP), Mobile Competence Centre, 650, Route Des Lucioles, F-06921 Sophia-AntiPolis Cedex, France, vol. RAN WG1, No. Taipei, Taiwan, Jan. 21, 2019-Jan. 25, 2019, Jan. 20, 2019 (Jan. 20, 2019), XP051593417, 29 Pages, Retrieved from the Internet: URL: http://www.3gpp.org/ftp/Meetings%5F3GPP%5FSYNC/RAN1/Docs/R1%2D1900505%2Ezip [retrieved on Jan. 20, 2019], Sections 1, 2.1.1.2 and 2.1.2 p. 19 tables 6-10.
International Search Report and Written Opinion—PCT/US2020/014429—ISA/EPO—dated Apr. 24, 2020.

* cited by examiner

| CGS index u | Sequence |
|---|---|
| 0 | $S_0$ |
| 1 | $S_1$ |
| 2 | $S_2$ |
| ... | ... |
| 29 | $S_{29}$ |

408

402

$S_{10}$ | $S_{26}$
DMRS 0 | DMRS 1

| DMRS group index | CGS Index pairing |
|---|---|
| 0 | (0, 29) |
| 1 | (1, 10) |
| 2 | (2, 16) |
| ... | |
| 29 | (29, 8) |

DEVICES AND METHODS FOR FACILITATING DMRS SEQUENCE GROUPING

PRIORITY CLAIM

This application claims priority to and the benefit of provisional patent application No. 62/796,006 filed in the U.S. Patent and Trademark Office on Jan. 23, 2019, and the benefit of provisional patent application No. 62/806,467 filed in the U.S. Patent and Trademark Office on Feb. 15, 2019, the entire contents of each of which are incorporated herein by reference as if fully set forth below in their entireties and for all applicable purposes.

TECHNICAL FIELD

The technology discussed below relates generally to wireless communication systems, and more particularly, to methods and devices for facilitating DMRS sequence grouping.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. The 3GPP is continually developing a next-generation evolution of LTE called New Radio (NR), which may correspond to a fifth generation (5G) network. As it stands today, 5G NR networks may exhibit a higher degree of flexibility and scalability than LTE, and are envisioned to support very diverse sets of requirements. Therefore, improvements in various aspects of 5G NR networks are desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various examples and implementations of the present disclosure facilitate demodulation reference signal (DMRS) sequence grouping. In at least one aspect of the present disclosure, wireless communication devices are provided. In at least one example, a wireless communication device may include a transceiver and a memory coupled to a processing circuit. The processing circuit and the memory may be configured to obtain information for a transmission scheduled with pi/2 BPSK modulation, where the transmission includes two or more symbols scheduled for a DMRS, referred to herein as DMRS symbols. The processing circuit and the memory may be further configured to identify a respective DMRS sequence for each of the two or more DMRS symbols, where each DMRS sequence subsequent to another DMRS sequence is dependent on its immediately preceding DMRS sequence. The processing circuit and the memory may be further configured to transmit via the transceiver the transmission including the identified respective DMRS sequence in each of the two or more DMRS symbols.

In at least one example, a wireless communication device may include a transceiver and a memory coupled to a processing circuit. The processing circuit and the memory may be configured to send a first transmission via the transceiver to schedule a second transmission from another wireless communication device with pi/2 BPSK modulation, where the second transmission is scheduled to include two or more DMRS symbols. The processing circuit and the memory may be further configured to receive the scheduled second transmission including the two or more DMRS symbols, wherein at least one DMRS symbol includes a DMRS sequence based on its immediately preceding DMRS sequence.

Further aspects provide methods of wireless communication and/or wireless communication devices including means to perform such methods. One or more examples of such methods may include obtaining information for a transmission scheduled with pi/2 BPSK modulation, where the transmission includes two or more DMRS symbols. A respective DMRS sequence for each of the two or more DMRS symbols may be identified, where each DMRS sequence subsequent to another DMRS sequence is dependent on its immediately preceding DMRS sequence, and the transmission including the identified respective DMRS sequence in each of the two or more DMRS symbols may be sent.

One or more further examples of such methods may include sending a first transmission to schedule a second transmission from another wireless communication device with pi/2 BPSK modulation, wherein the second transmission is scheduled to include two or more DMRS symbols, and receiving the scheduled second transmission including the two or more DMRS symbols, where at least one DMRS symbol includes a DMRS sequence based on its immediately preceding DMRS sequence.

Still further aspects of the present disclosure include computer-readable storage mediums storing processor-executable programming. In at least one example, the processor-executable programming may be adapted to cause a processing circuit to obtain information for a transmission scheduled with pi/2 BPSK modulation, where the transmission includes two or more DMRS symbols. The processor-executable programming may be further adapted to cause a processing circuit to identify a respective DMRS sequence for each of the two or more DMRS symbols, where each subsequent DMRS sequence is dependent on its immediately preceding DMRS sequence. The processor-executable programming may be further adapted to cause a processing circuit to send the transmission including the identified respective DMRS sequence in each of the two or more DMRS symbols.

In at least one example, the processor-executable programming may be adapted to cause a processing circuit to send a first transmission to schedule a second transmission from another wireless communication device with pi/2

BPSK modulation, where the second transmission is scheduled to include two or more DMRS symbols. The processor-executable programming may be further adapted to cause a processing circuit to receive the scheduled second transmission including the two or more DMRS symbols, wherein at least one DMRS symbol includes a DMRS sequence based on its immediately preceding DMRS sequence.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 is a block diagram illustrating an example of DMRS sequence hopping.

DETAILED DESCRIPTION

Figure 1:
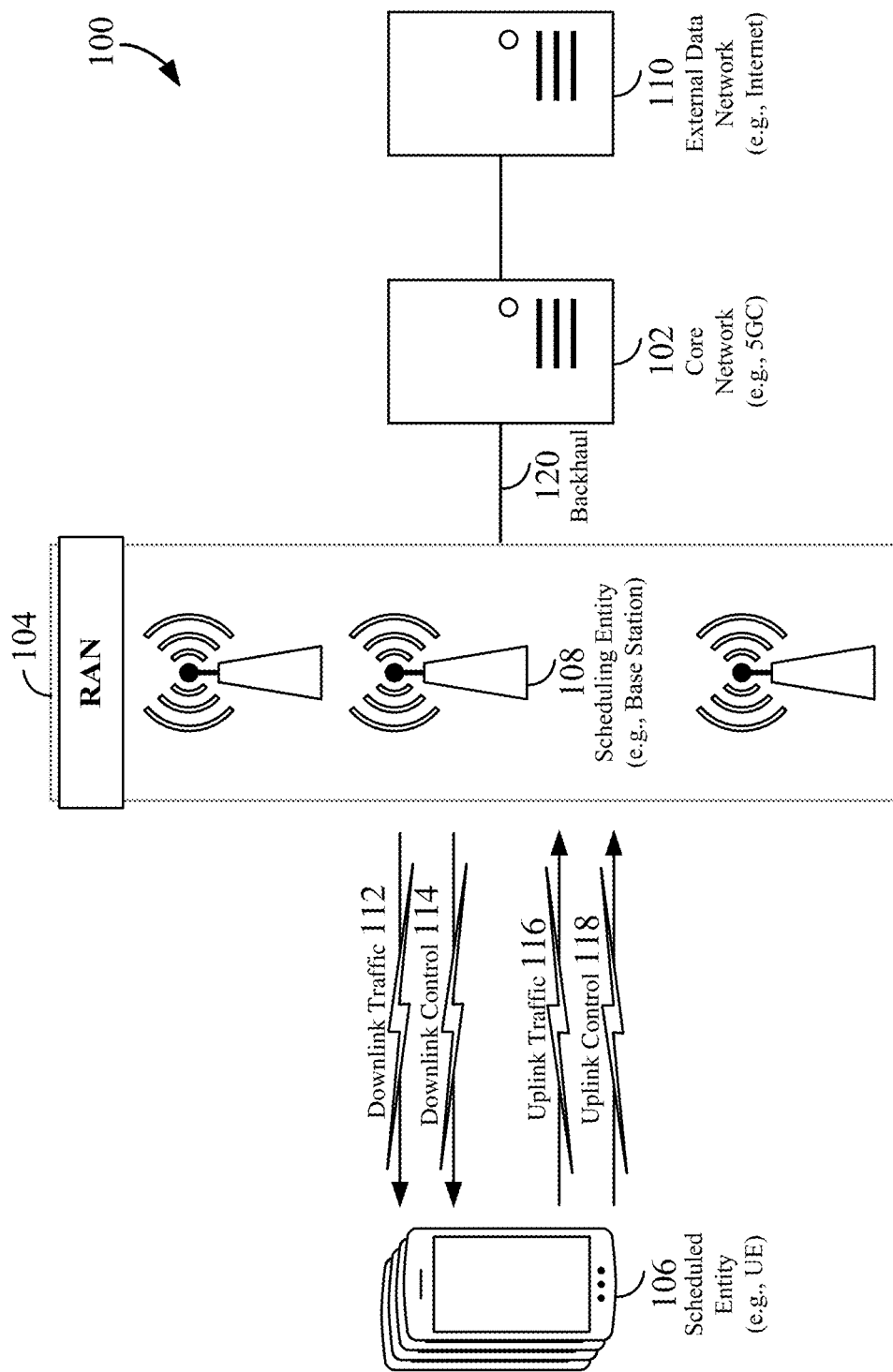
FIG. 1 is a schematic diagram illustrating an example of a wireless communication system according to some embodiments.

As wireless communications occur within a radio access network (RAN), transmissions between scheduling entities and scheduled entities may include a demodulation reference signal (DMRS). The DMRS is utilized by a wireless communications device to produce channel estimates for demodulation of an associated physical channel. The DMRS may be device-specific and transmitted on demand. In some instances, DMRS sequence design supports uplink transmissions with pi/2 BPSK modulation and uses a time-domain constant-modulus sequence. In some cases, a scheduled entity may utilize a "Gold sequence" when the length for the DMRS is 30 or greater for pi/2 BPSK modulation, while the scheduled entity may utilize a computer-generated DMRS sequence for pi/2 BPSK modulation when the length for the DMRS is less than 30 (e.g., 6, 12, 18, or 24). A DMRS can be viewed as a sequence of complex numbers, e.g., $a\_0, a\_1, \ldots, a\_\{N-1\}$, where the length of such a DMRS sequence is N, and refers to the number of complex numbers/elements in the sequence.

DMRS sequences having perfect autocorrelation properties may be desired for performing channel estimation. The computer-generated DMRS sequences (CGS) used in some DMRS designs when the length of the DMRS is less than 30, however, may lack perfect autocorrelation properties due to time-domain modulation of the DMRS sequences. According to one or more aspects of the present disclosure, wireless communication devices are configured to employ predefined DMRS sequence groupings for uplink DMRS transmissions scheduled with pi/2 BPSK modulation with DMRS lengths less than 30. In at least some instances, the scheduling entity may configure or instruct the scheduled entity to use these predefined DMRS sequence groupings, such as by instructing the scheduled entity to utilize a DMRS sequence for a first DMRS symbol and then, for subsequent DMRS symbols, corresponding DMRS sequence(s) from a table that maps or defines how to derive a set of DMRS sequences based on prior DMRS sequences. Accordingly, as will be described in further detail herein, aspects of the present disclosure provide for deterministic DMRS sequence hopping where different DMRS/CGS sequences are used on different DMRS symbols, and the DMRS sequence used for a second or subsequent DMRS symbol may be determined based on the DMRS sequence on a first or prior DMRS symbol in a deterministic way. As used throughout the present disclosure, a DMRS symbol refers to a symbol that is scheduled for a DMRS.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In some instances, a base station 108 may transmit resource grants to schedule a user equipment (UE) for a future communication. Accordingly, as used in the present disclosure, a base station 108 may also be referred to as a scheduling entity in some examples.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 from the scheduling entity 108 to one or more scheduled entities 106 and, in some examples, uplink traffic 116 from one or more scheduled entities 106 to the scheduling entity 108. The scheduling entity 108 may transmit scheduling information on downlink control channels 114 and then communicate with scheduled entities 106 on the scheduled resources using downlink traffic channels 112 or uplink traffic channels 116.

The scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may also transmit uplink control information 118, such as feedback reports or acknowledgement messages, for example. In some instances, the uplink control signals 118 transmitted by the scheduled entity 106 may include references signals such as DMRS signals used in channel estimation. The scheduled entity 106 may perform sequence hopping when transmitting DMRS sequences on the uplink 118 where different DMRS sequences are used in different DMRS symbols. In certain instances, a mapping is used such that the scheduled entity 106 transmits, on uplink control signaling 118 to a scheduling entity 108, a first DMRS sequence and then a second DMRS that is determined based on the first DMRS sequence. The dependency of a subsequent DMRS sequence on a prior DMRS sequence may improve autocorrelation properties of the transmitted DMRS sequences. Accordingly, as will be described in further detail herein, the present disclosure provides for aspects of deterministic DMRS sequence hopping where different DMRS/CGS sequences are used on different DMRS symbols, and the DMRS sequence used for a second or subsequent DMRS symbol may be determined based on the DMRS sequence on a first or prior DMRS symbol in a deterministic way.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5 GC). In other examples, the core network 102 may be configured according to a 4G evolved packet core (EPC), or any other suitable standard or configuration.

Figure 2:
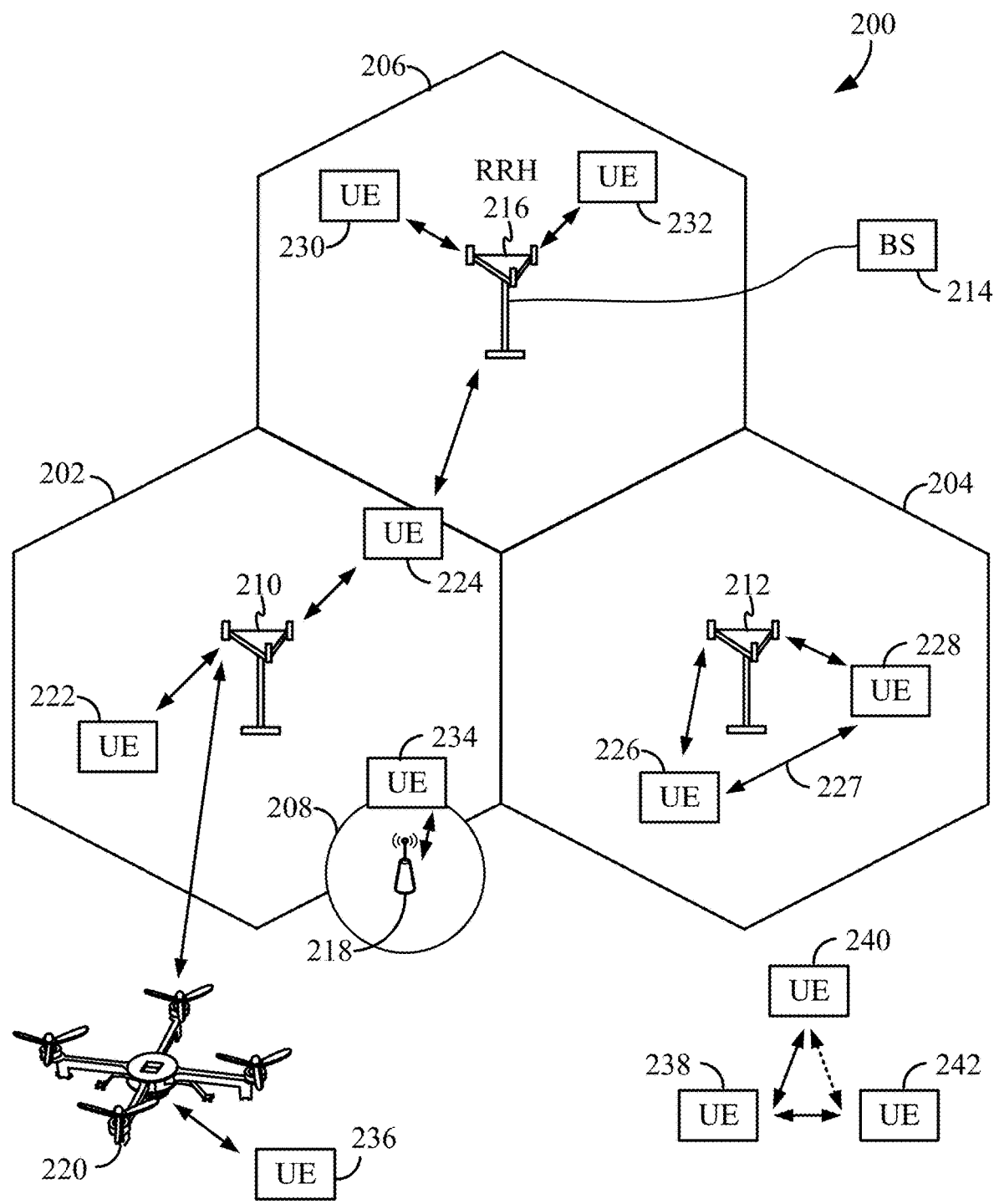
FIG. 2 is a conceptual diagram illustrating an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
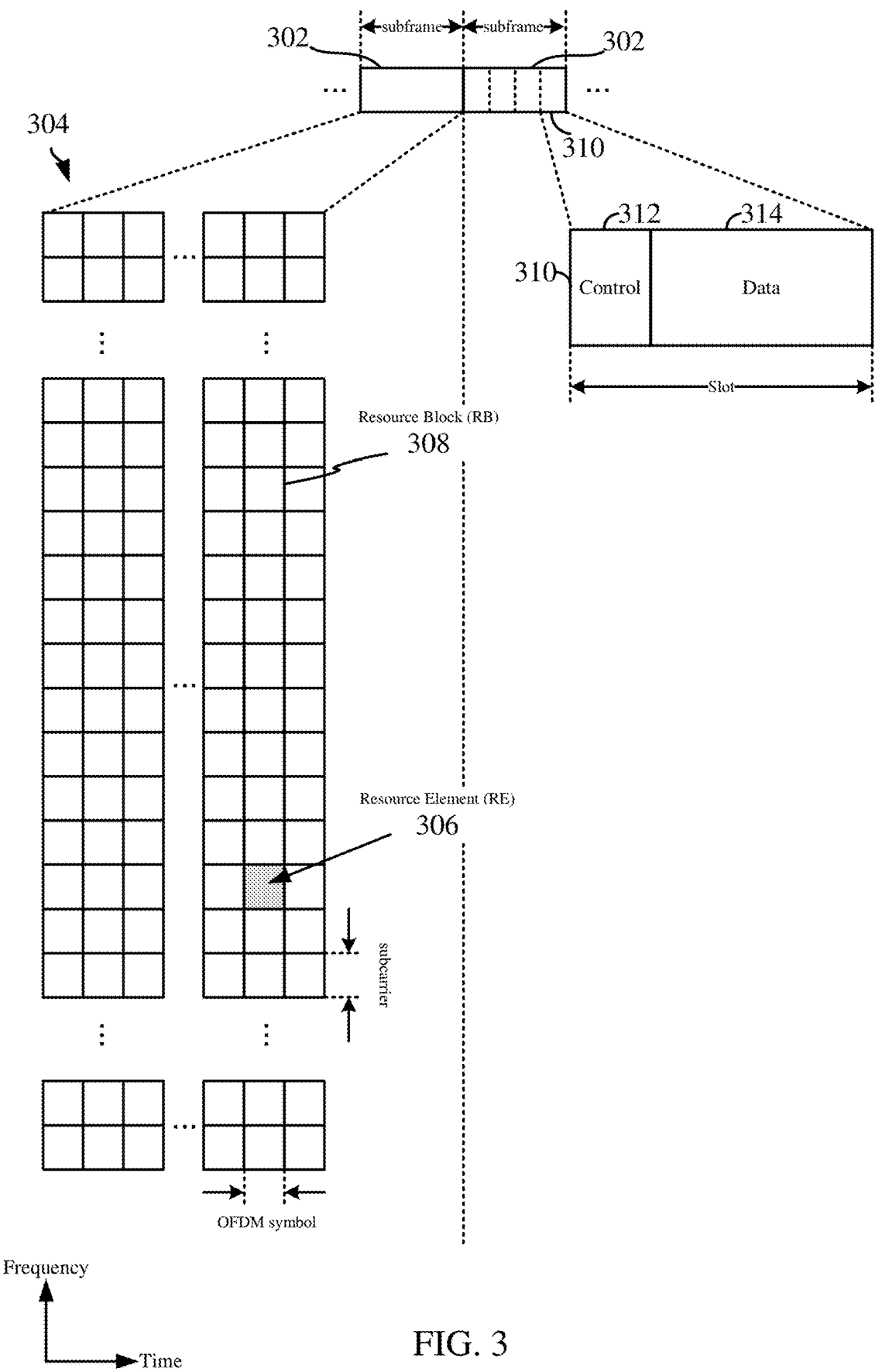
FIG. 3 is a schematic diagram illustrating organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DMRS); phase-tracking reference signals (PT-RS); channel-state information reference signals (CSI-RS); etc.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DMRS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Modulation techniques used in wireless telecommunications include amplitude-shift keying (ASK), frequency shift keying (FSK), phase shift keying (PSK), and quadrature amplitude modulation (QAM), as some examples. Concerning PSK, a form of PSK known as binary PSK (BPSK) uses two phases that are separated by 180° in phase to respectively represent a binary "0" or "1" for the modulated signal. While BPSK typically maps the two constellation points on the real axis of the real/imaginary plane (i.e., at 0° and 180°), it does not matter exactly where constellation points are positioned in the complex plane, and the rotation of these points for other variants of BPSK are possible, and such variants may be beneficial for modulation of signals in terms of PAPR, especially when combined with filtering. In one example, pi/2-BPSK modulation rotates the constellation points by pi/2 (90°) on the complex plane in alternating symbols. This modulation has been shown to reduce the PAPR compared to other modulation schemes such as standard BPSK on the real axis or QAM. This PAPR advantage is further augmented when pi/2-BPSK modulation is used with filtering.

As a wireless communications occur within a RAN, transmissions between scheduling entities and scheduled entities may include a demodulation reference signal (DMRS). The DMRS is utilized by a wireless device to produce channel estimates for demodulation of an associated physical channel. The DMRS is device specific, and is transmitted on demand. In Release 16 of the 3GPP specifications for 5G NR networks, a new DMRS sequence design is supported for uplink transmissions with pi/2 BPSK modulation. The new sequence is a time-domain constant-modulus sequence. When the length for the DMRS is 30 or greater for pi/2 BPSK modulation, the scheduled entity will typically utilize a sequence that is known in the art as the "Gold sequence." A Gold sequence is a BPSK modulated sequence with a length of 127 having bounded small cross-correlations within a set. Generic pseudo-random sequences are defined by a length-31 Gold sequence, specified in 3GPP specification TS 38.211.

When the length for the DMRS is less than 30 (e.g., 6, 12, 18, or 24), the scheduled entity may utilize a computer-generated DMRS sequence for pi/2 BPSK. As used herein, the DMRS length refers to the length of the DMRS base sequence before DFT spread in one DMRS symbol. DFT spread may also be referred to as transform precoding in 3GPP specifications. For example, in 5G NR, for a PUSCH transmission, the DMRS length is equal to the number of scheduled subcarriers (e.g., 12 multiplied by the number of RBs) divided by two. For a PUCCH transmission, the DMRS length is equal to the number of scheduled subcarriers (i.e., 12 multiplied by the number of RBs).

One issue faced by such computer-generated DMRS sequences is the lack of perfect autocorrelation for such sequences. Autocorrelation for a sequence s(n) with a given delay tap is calculated by the sum of the sequence and its conjugate with certain cyclic shift, as demonstrated by the following formula:

$$A(d) = \frac{1}{N} \left| \sum_{i=0}^{N-1} s(i) \cdot Conj(s(\mod(d+i, N))) \right|,$$

$$d = -\frac{N}{2}+1, \ldots, 0 \ldots, \frac{N}{2}-1$$

A sequence ('s') has a perfect autocorrelation when the result is 1 at zero delay tap, and 0 for any other cyclic shift (e.g., A(0)=1, A(d)=0 for all 'd' ≠0). A perfect autocorrelation is beneficial for channel estimation. However, perfect autocorrelation is difficult to achieve when the DMRS sequence is modulated in the time-domain, compared to being modulated in the frequency domain. Because the DMRS is modulated in the time domain in the present case, it is desirable to utilize a DMRS sequence that exhibits zero or small autocorrelation on certain delay taps.

In Release 15 of the 3GPP specifications for 5G NR networks, when some transmissions include multiple DMRS sequences (e.g., PUSCH transmission), the scheduled entity will employ DMRS sequence hopping. DMRS sequence hopping can randomize the interference. FIG. 4 is a block diagram illustrating an example of DMRS sequence hopping. As shown, an uplink transmission 402 may include two DMRS symbols, DMRS0 404 and DMRS1 406. DMRS sequence hopping involves a scheduled entity transmitting a first sequence in the first DMRS symbol 404 and a second sequence in the second DMRS symbol 406. More specifically, a table 408 of computer-generated sequences is provided for instances when the DMRS length is less than 30, and a specific DMRS sequence is selected from the table 408 for the first DMRS symbol 404 and a second DMRS sequence is selected from the table 408 for the second DMRS symbol 406. In the depicted example, the scheduled entity is transmitting sequence 10 ($S_{10}$) in the first DMRS symbol 404 and sequence 26 ($S_{26}$) in the second DMRS symbol 406, where sequences $S_{10}$ and $S_{26}$ are defined by the table 408. Typically, the scheduling entity will instruct the scheduled entity which sequence from the table 408 is to be used for each symbol. According to Release 15 of the 3GPP specifications for 5G NR networks, the choice of DMRS sequences are determined based on the following formula, which is essentially a pseudo-random number generator:

$$u = (f_{gh} + n_{ID}^{RS}) \bmod 30$$

$$f_{gh} = (\Sigma_{m=0}^{7} 2^m c(8(N_{symb}^{slot} n_{s,f}^\mu + l) + m)) \bmod 30$$

where u is the index number associated with a sequence in the table 408, $f_{gh}$ is defined by the indicated function, and $n_{ID}^{RS}$ is an ID configured by the scheduled entity. Further, in the equation for $f_{gh}$, the result is partially based on the parameter 'l', which represents the DMRS location. In the example depicted in FIG. 4, 'l' is equal to either 0 or 1 (DMRS0 or DMRS1). As a result, in different DMRS symbols, a different DMRS sequence will be used according to these functions. In operation, an index number (u) is calculated using these formulas, where the calculated index number is associated with a particular DMRS sequence in the table 408.

Because the selection of DMRS sequences for each symbol is randomly generated according to the equations, there is no assurance that a DMRS sequence or combinations of DMRS sequences will exhibit good autocorrelation properties. According to one or more aspects of the present disclosure, wireless communication devices are configured to employ predefined DMRS sequence groupings for uplink DMRS transmissions scheduled with pi/2 BPSK modulation with DMRS lengths less than 30. In at least some instances, the scheduling entity may configure or instruct the scheduled entity to use these predefined DMRS sequence groupings, such as by instructing the scheduled entity to utilize Release 16 or later of the 3GPP specifications for 5G NR networks.

Figures 5, 6:
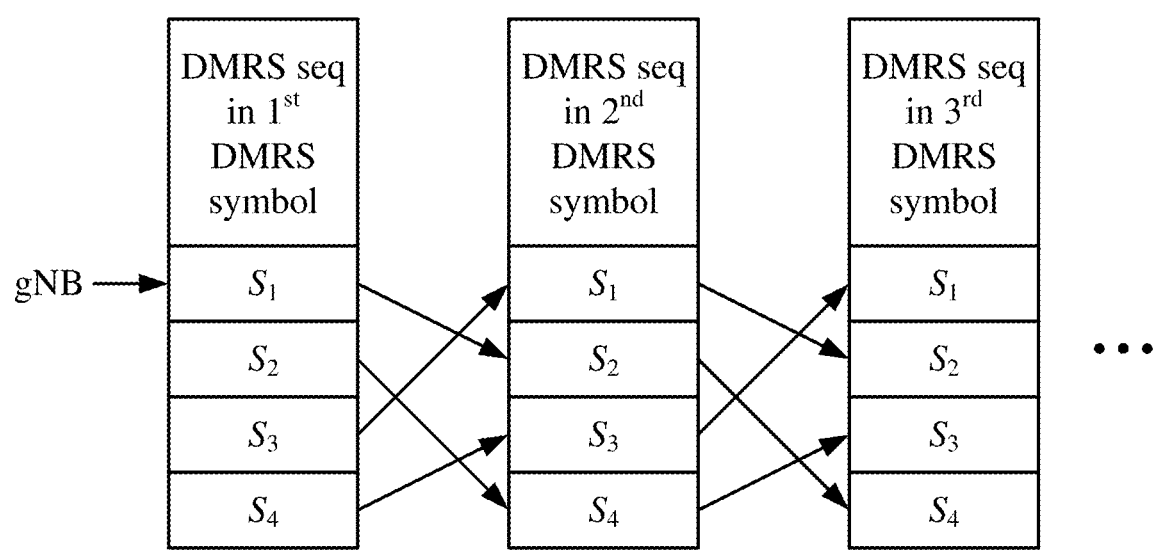
FIG. 5 is an example of a portion of a DMRS grouping table that may be employed by the scheduled entity to determine which DMRS sequence to use in each DMRS symbol of an uplink transmission.
FIG. 6 is a block diagram illustrating one example of a DMRS grouping table that designates a subsequent DMRS sequence based on the previous DMRS sequence.

For example, a scheduled entity may determine a DMRS sequence for a first DMRS symbol. Then, for a subsequent DMRS symbol in the same uplink transmission, the scheduled entity employs the corresponding DMRS sequence(s) from a table identifying sets of DMRS sequences or defining how to derive a set of DMRS sequences. FIG. 5 is an example of a portion of a DMRS grouping table 502 that may be employed by the scheduled entity to determine which DMRS sequence to use in each DMRS symbol of an uplink transmission. In the depicted example, there are computer-generated sequence (CGS) pairings for each group index. As shown, the scheduled entity may be instructed by the scheduling entity to employ DMRS group index 1 for an uplink transmission that includes two DMRS symbols. As a result, the scheduled entity will send DMRS sequence $S_1$ in the first DMRS symbol, and sequence $S_{10}$ in the second DMRS symbol, according to the table 502.

The grouping table(s) may be provided to the scheduled entity. In some examples, the grouping table(s) can be standardized, such as according to a 3GPP specification. In such examples, the scheduled entity may be pre-provisioned with the grouping table(s). In other examples, the scheduling entity (e.g., gNB) may be adapted to configure one or more grouping tables utilizing RRC configuration. In the case of a scheduling entity utilizing RRC configuration, RRC signaling may be configured to let the scheduled entity know whether to use a conventional random selection method, or whether to follow a predefined table.

In some examples, separate grouping tables may be employed for different DMRS lengths. For example, DMRS lengths less than 30 may be 6, 12, 18, and 24. As a result, a respective grouping table may be defined for each possible DMRS length. For example, a CGS pairing table may be defined for DMRS length 12 as depicted in Table 1, a CGS pairing table may be defined for DMRS length 18 as depicted in Table 2, and a CGS pairing table may be defined for DMRS length 24 as depicted in Table 3. As shown in the example Tables 1-3 below, a particular CGS index for the first DMRS symbol indicated in a table may map to a particular CGS index for the second DMRS symbol. In Table 1, for example, a CGS index of 3 for the first DMRS symbol would map to a CGS index of 15 for the second DMRS symbol.

TABLE 1 length-12 CGS pairing table

| CGS index on the first DMRS symbol | CGS index on the second DMRS symbol |
| --- | --- |
| 0 | 16 |
| 1 | 1 |
| 2 | 7 |
| 3 | 15 |
| 4 | 4 |
| 5 | 29 |
| 6 | 24 |
| 7 | 26 |
| 8 | 27 |
| 9 | 22 |
| 10 | 6 |
| 11 | 25 |
| 12 | 8 |
| 13 | 28 |
| 14 | 11 |
| 15 | 0 |

TABLE 1-continued length-12 CGS pairing table

| CGS index on the first DMRS symbol | CGS index on the second DMRS symbol |
|---|---|
| 16 | 19 |
| 17 | 21 |
| 18 | 23 |
| 19 | 12 |
| 20 | 14 |
| 21 | 17 |
| 22 | 10 |
| 23 | 2 |
| 24 | 3 |
| 25 | 20 |
| 26 | 9 |
| 27 | 18 |
| 28 | 13 |
| 29 | 5 |

TABLE 2 length-18 CGS pairing table

| CGS index on the first DMRS symbol | CGS index on the second DMRS symbol |
|---|---|
| 0 | 5 |
| 1 | 27 |
| 2 | 2 |
| 3 | 29 |
| 4 | 19 |
| 5 | 1 |
| 6 | 28 |
| 7 | 10 |
| 8 | 6 |
| 9 | 25 |
| 10 | 26 |
| 11 | 4 |
| 12 | 20 |
| 13 | 11 |
| 14 | 23 |
| 15 | 0 |
| 16 | 24 |
| 17 | 21 |
| 18 | 17 |
| 19 | 13 |
| 20 | 9 |
| 21 | 22 |
| 22 | 3 |
| 23 | 14 |
| 24 | 8 |
| 25 | 12 |
| 26 | 15 |
| 27 | 7 |
| 28 | 16 |
| 29 | 18 |

TABLE 3 length-24 CGS pairing table

| CGS index on the first DMRS symbol | CGS index on the second DMRS symbol |
|---|---|
| 0 | 17 |
| 1 | 28 |
| 2 | 3 |
| 3 | 1 |
| 4 | 19 |
| 5 | 18 |
| 6 | 15 |
| 7 | 26 |
| 8 | 23 |
| 9 | 8 |
| 10 | 16 |
| 11 | 24 |
| 12 | 13 |
| 13 | 21 |
| 14 | 14 |
| 15 | 6 |
| 16 | 7 |
| 17 | 9 |
| 18 | 5 |
| 19 | 2 |
| 20 | 0 |
| 21 | 22 |
| 22 | 12 |
| 23 | 27 |
| 24 | 4 |
| 25 | 10 |
| 26 | 11 |
| 27 | 29 |
| 28 | 20 |
| 29 | 25 |

In some examples, separate grouping tables may be defined for the different possible numbers of DMRS symbols for an uplink transmission. For example, in some embodiments, uplink transmissions may include 1, 2, 3, or 4 DMRS symbols, although such an example is not intended to be limiting. Indeed, the specific number of DMRS symbols for an uplink transmission may vary to any number as desired. In such an example with up to four DMRS symbols, respective tables may be defined for each possible variation. For instance, FIG. 5 would represent a table defined for uplink transmissions employing 2 DMRS symbols. Another table would be defined for uplink transmission employing 3 DMRS symbols, and another table would be defined for uplink transmissions employing 4 DMRS symbols. In such examples, the scheduled entity would either identify a DMRS group index, or would be assigned a DMRS group index by the scheduling entity, and would transmit each of the DMRS sequences in the order specified by the table. In this example, each table can be optimized for the given number of DMRS symbols to achieve the best autocorrelation results.

In some examples, one table may be defined for the maximum number of DMRS symbols that may be possible for any uplink transmission. In the example above, the maximum was 4 DMRS symbols. In such an example, a table may be configured with each group index identifying 4 DMRS sequences. A scheduled entity would then either identify a DMRS group index, or would be assigned a DMRS group index by the scheduling entity. With a DMRS group index identified, the scheduled entity can transmit DMRS sequences in order according to the DMRS group index until the last DMRS symbol is transmitted. For example, if an uplink transmission includes 3 DMRS symbols, the scheduled entity will transmit the first three DMRS sequences of the identified DMRS group index. Generally speaking, the scheduled entity will transmit the first k DMRS sequences in a DMRS group index, where k is equal to the number of DMRS symbols in the uplink transmission.

In some examples, pairings of DMRS sequences may be specified in a manner that a subsequent DMRS sequence is dependent on the previous DMRS sequence. FIG. 6 is a block diagram illustrating one example of a DMRS grouping table that designates a subsequent DMRS sequence based on the previous DMRS sequence. As shown, the scheduling entity (e.g., gNB) may designate an initial DMRS sequence for the first DMRS symbol in an uplink transmission. Based on the DMRS sequence indicated by the scheduling entity, the scheduled entity now follows the table to determine which DMRS sequence to transmit in the next DMRS symbol of the uplink transmission. In the example in FIG. 6, the scheduling entity instructs the scheduled entity to use the DMRS sequence $S_1$ in the first DMRS symbol. For example, the scheduling entity may send a sequence start indicator to the scheduled entity to identify the starting DMRS sequence $S_1$ for the first DMRS symbol. The table indicates to the scheduled entity to transmit the DMRS sequence $S_2$ in the subsequent DMRS symbol. If there is a third DMRS symbol, then the table indicates to the scheduled entity to transmit DMRS sequence $S_4$, and so on until all DMRS symbols are transmitted. Thus, the scheduled entity utilizes the table to determine what the next or subsequent DMRS sequence will be based on the immediately preceding DMRS sequence. Accordingly, aspects of the present disclosure provide for deterministic DMRS sequence hopping where different DMRS/CGS sequences are used on different DMRS symbols, and the DMRS sequence used for a second or subsequent DMRS symbol may be determined based on the DMRS sequence on a first or prior DMRS symbol in a deterministic way.

Another way such a table may be configured is to include mapping rules between DMRS sequences, such that for each respective DMRS sequence the mapping indicates what will be the next subsequent DMRS sequence. For example, the table in FIG. 5 may indicate that for DMRS sequence $S_0$, the next subsequent DMRS sequence will be $S_{29}$. Similarly, the table in FIG. 5 further indicates that for sequence $S_{29}$, the next subsequent DMRS sequence will be sequence $S_8$. The example in FIG. 6 only shows 4 DMRS sequences, but it should be apparent that the number of DMRS sequences provided in the table, as well as their pairings may be any number and order desired. For instance, at least one example of a DMRS grouping table may include 30 distinct sequences.

In all of the examples above, the groupings of DMRS sequences can be determined by optimizing the joint autocorrelation of the DMRS sequences. For example, if a first DMRS symbol uses DMRS sequence $S_1$, then the next DMRS symbol may use a DMRS sequence $S_j$ such that the joint autocorrelation of $S_1$ and $S_j$ satisfy certain properties defined by the following equation:

$$B(d) = \frac{1}{2N}\left|\sum_{i=0}^{N-1} s(i) \cdot Conj(s(\mod(d+i, N))) + \sum_{i=0}^{N-1} \tilde{s}(i) \cdot Conj(\tilde{s}(\mod(d+i, N)))\right|, d = -\frac{N}{2}+1, \ldots, 0 \ldots, \frac{N}{2}-1$$

In some examples, the joint autocorrelation property may be zero correlation on certain delay taps (e.g., $B(1)=B(-1)=0$ or $B(-2)=B(-1)=B(1)=B(2)=0$). In some examples, the joint autocorrelation property may be small on certain delay taps such that $B(d)$ is bounded by a threshold (e.g., $B(d) \leq \gamma$, for all $d=-3, -2, -1, 1, 2, 3$, where $\gamma$ is a threshold value).

In addition to determining the groupings of DMRS sequences according to the joint autocorrelation, the groupings may also be determined so that each grouping has a distinct first element, second element, third element, etc. In other words, the mapping from the first DMRS sequence to the second DMRS sequence is such that two DMRS sequences do not map to the same subsequent DMRS sequence. Said yet another way, if DMRS sequence $S_1$ maps to DMRS sequence $S_2$ in FIG. 6, then DMRS sequence $S_1$ will be the only DMRS sequence in the table that will map to DMRS sequence $S_2$, and none of the other DMRS sequences will map to DMRS sequence $S_2$. Such one-to-one mapping can help to ensure that a neighboring cell will not end up using the same DMRS sequence on the same DMRS symbols.

Figure 7:
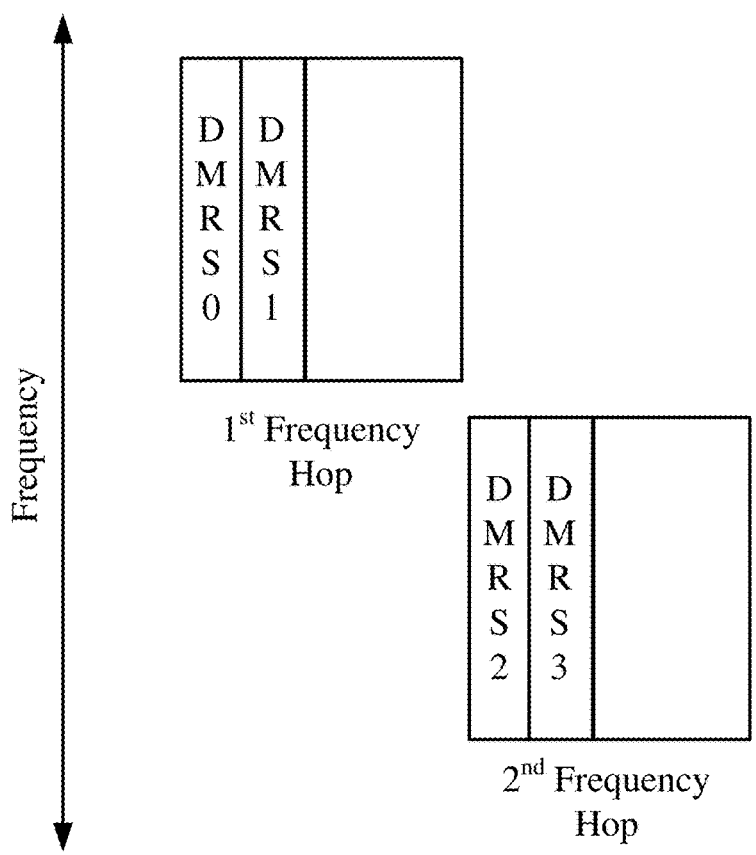
FIG. 7 is a block diagram illustrating an uplink transmission employing frequency hopping according to at least one example.

In some instances, a scheduled entity may be configured to employ frequency hopping when transmitting uplink communications. For example, a PUSCH may be scheduled with frequency hopping to achieve frequency diversity. FIG. 7 is a block diagram illustrating an uplink transmission employing frequency hopping according to at least one example. In the depicted example, the uplink transmission includes four DMRS symbols, identified respectively as DMRS0, DMRS1, DMRS2, and DMRS3. As shown, the first DMRS symbol DMRS0 and the second DMRS symbol DMRS1 are sent in the first frequency, while the third and fourth DMRS symbols DMRS2 and DMRS3 are sent in the second frequency. Because the two frequencies will have different channel characteristics, the receiver may need to estimate the channel information on the two frequencies separately. As such, there is no need to jointly optimize the auto-correlation of the DMRS sequences in different frequency hops. Accordingly, the scheduled entity may treat each frequency transmission as a separate transmission when determining the DMRS sequence for each DMRS symbol. For example, the scheduled entity may select the DMRS sequences for the first and second DMRS symbols DMRS0 and DMRS1 as a DMRS sequence pair where the DMRS sequence for the second DMRS symbol DMRS1 is dependent on the DMRS sequence transmitted in the first DMRS symbol DMRS0. The scheduled entity then determines a new and separate DMRS sequence pair for the third and fourth symbols DMRS2 and DMRS3, such that the DMRS sequence for the third symbol DMRS2 is independent of any other symbol and the DMRS sequence for the fourth symbol DMRS3 is dependent on the DMRS sequence transmitted in the third DMRS symbol DMRS2. In the example in FIG. 7, if the scheduled entity has a table for 2 DMRS symbols and another table for 4 DMRS symbols, then the scheduled entity will use the table for 2 DMRS symbols for determining the DMRS sequences in each hop.

Figure 8:
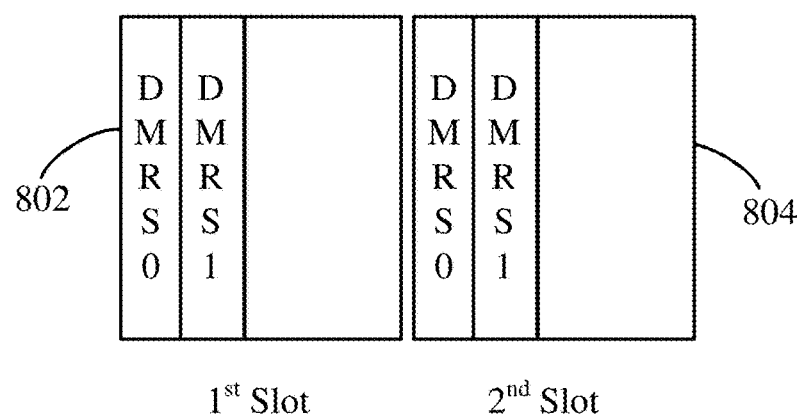
FIG. 8 is a block diagram depicting an example where the same transmission is repeated across two different slots.

In some instances, a scheduled entity may be configured to employ uplink transmission bundling. For example, the scheduled entity may be configured to transmit the same PUSCH transmission repeated across multiple slots. FIG. 8 is a block diagram depicting an example where the same transmission is repeated across two different slots. In such examples, the receiver may perform a joint channel estimation across the multiple copies of the same uplink transmission. As such, a performance gain may be achieved by jointly optimizing the DMRS sequences (and in particular their autocorrelation) in the multiple slots. Accordingly, the scheduled entity may be configured to treat the DMRS symbols across the two slots as a group. More specifically, the example in FIG. 8 includes a first slot 802 and a second slot 804. Each slot includes a first DMRS symbol DMRS0 and a second DMRS symbol DMRS1. As noted, instead of retransmitting the same DMRS sequences in the first and second symbols DMRS0 and DMRS1 in each slot, the scheduled entity can treat the first and second symbols DMRS0 and DMRS1 in the second slot 804 as though there were third and fourth DMRS symbols. As a result, the scheduled entity may select a DMRS sequence for the first DMRS symbol DMRS0 in the second slot 804 in response to (or based on) the DMRS sequence transmitted in the second DMRS symbol DMRS1 of the first slot 802.

In some examples, a scheduled entity may employ portions of the Gold sequence when the total length of the DMRS symbols is greater than or equal to 30. That is, a long Gold sequence may be segmented into two or more short sub-Gold sequences. The lengths of the sub-Gold sequences may be less than 30. For instance, when two or more DMRS symbols are scheduled, each with length N, instead of transmitting two separate length N sequences, the scheduled entity may transmit a length 2N (or 3N, 4N, etc.) sequence, with each segment transmitted in each DMRS symbol. As an example, an uplink transmission may be scheduled with two DMRS symbols, where the DMRS sequence in each DMRS symbol is scheduled with a length of 18. Instead of transmitting a respective computer-generated sequence in each of the DMRS symbols, the scheduled entity can treat the two DMRS symbols as though it were a single DMRS symbol with a length of 36 (e.g., 18+18). The scheduled entity may accordingly transmit a length of 36 of the DMRS Gold sequence split equally among the two DMRS symbols (e.g., the first 18 of the Gold sequence in the first DMRS symbol and the next 18 of the Gold sequence in the second DMRS symbol).

Additionally, the instances described above with reference to FIGS. 7 and 8 may also apply in these embodiments. That is, DMRS symbols that are part of a frequency hopping scheme may not apply the DMRS Gold sequence across slots on different frequencies, as described with reference to FIG. 7. Additionally, bundled slots may apply the DMRS Gold sequence across the multiple bundled slots, as described with reference to FIG. 8.

Although the examples above are described for uplink transmissions from a scheduled entity to a scheduling entity, it should be understood that a scheduling entity may also utilize the operations and processes described above for downlink transmissions to a scheduled entity. That is, a scheduling entity may utilize the described operations and processes to determine DMRS sequences to be transmitted in a downlink transmission received by a scheduled entity. Similarly, a scheduled entity may perform the operations and processes described above for a scheduling entity in receiving the DMRS transmissions from a scheduled entity.

Figure 9:
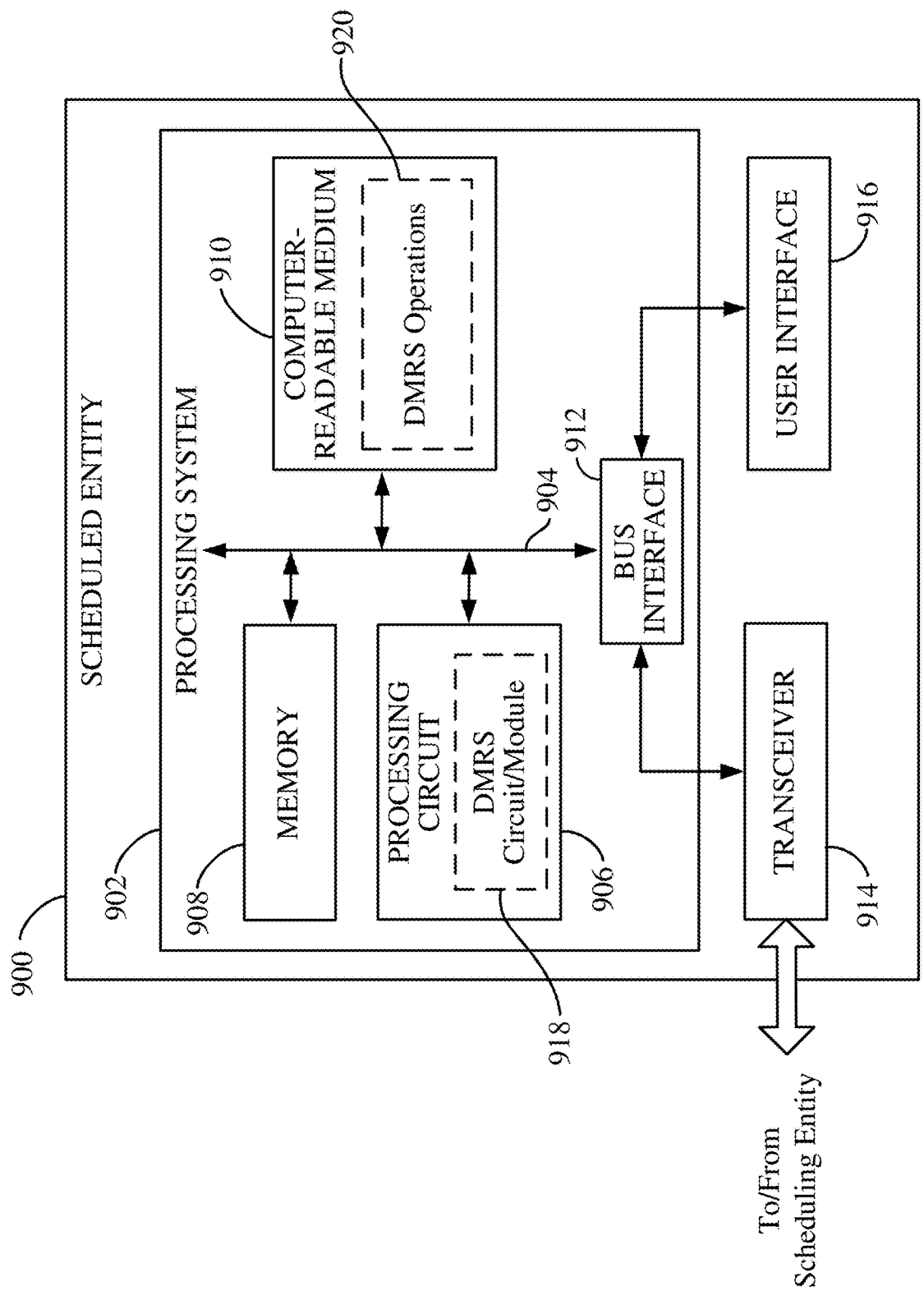
FIG. 9 is a block diagram illustrating select components of a scheduled entity according to at least one example.

Turning now to FIG. 9, a block diagram is depicted illustrating select components of a scheduled entity 900 employing a processing system 902 according to at least one example of the present disclosure. In this example, the processing system 902 is implemented with a bus architecture, represented generally by the bus 904. The bus 904 may include any number of interconnecting buses and bridges depending on the specific application of the processing system 902 and the overall design constraints. The bus 904 communicatively couples together various circuits including one or more processors (represented generally by the processing circuit 906), a memory 908, and computer-readable media (represented generally by the storage medium 910). The bus 904 may also link various other circuits such as timing sources, peripherals, voltage regulators, and power management circuits, which are well known in the art, and therefore, will not be described any further. A bus interface 912 provides an interface between the bus 904 and a transceiver 914. The transceiver 914 provides a means for communicating with various other apparatus over a transmission medium. For example, the transceiver 914 may include a receive chain to receive one or more wireless signals, and/or a transmit chain to transmit one or more wireless signals. Depending upon the nature of the apparatus, a user interface 916 (e.g., keypad, display, speaker, microphone, joystick) may also be provided.

The processing circuit 906 is responsible for managing the bus 904 and general processing, including the execution of programming stored on the computer-readable storage medium 910. The programming, when executed by the processing circuit 906, causes the processing system 902 to perform the various functions described below for any particular apparatus. The computer-readable storage medium 910 and the memory 908 may also be used for storing data that is manipulated by the processing circuit 906 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 906 is arranged to obtain, process and/or send data, control data access and storage, issue commands, and control other desired operations. The processing circuit 906 may include circuitry adapted to implement desired programming provided by appropriate media, and/or circuitry adapted to perform one or more functions described in this disclosure. For example, the processing circuit 906 may be implemented as one or more processors, one or more controllers, and/or other structure configured to execute executable programming and/or execute specific functions. Examples of the processing circuit 906 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 906 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 906 are for illustration and other suitable configurations within the scope of the present disclosure are also contemplated.

In some instances, the processing circuit 906 may include a DMRS circuit and/or module 918. The DMRS circuit/module 918 may generally include circuitry and/or programming (e.g., programming stored on the storage medium 910) adapted to generate and send a DMRS according to one or more aspects of the present disclosure. For example, the DMRS circuit/module 918 may include circuitry and/or programming (e.g., programming stored on the storage medium 910) adapted to obtain information for a transmission scheduled with pi/2 BPSK modulation, where the transmission includes two or more symbols scheduled for a DMRS. The DMRS circuit/module 918 may further include circuitry and/or programming (e.g., programming stored on the storage medium 910) adapted to identify a respective DMRS sequence for each of the two or more DMRS symbols, where each subsequent DMRS sequence is dependent on its immediately preceding DMRS sequence. The DMRS circuit/module 918 may further include circuitry and/or programming (e.g., programming stored on the storage medium 910) adapted to send the transmission including the identified respective DMRS sequence in each of the two or more DMRS symbols. As used herein, reference to circuitry and/or programming may be generally referred to as logic (e.g., logic gates and/or data structure logic).

The storage medium 910 may represent one or more computer-readable devices for storing programming, such as processor executable code or instructions (e.g., software, firmware), electronic data, databases, or other digital information. The storage medium 910 may also be used for storing data that is manipulated by the processing circuit 906 when executing programming. The storage medium 910 may be any available non-transitory media that can be accessed by a general purpose or special purpose processor, including portable or fixed storage devices, optical storage devices, and various other mediums capable of storing, containing and/or carrying programming. By way of example and not limitation, the storage medium 910 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 910 may be coupled to the processing circuit 906 such that the processing circuit 906 can read information from, and write information to, the storage medium 910. That is, the storage medium 910 can be coupled to the processing circuit 906 so that the storage medium 910 is at least accessible by the processing circuit 906, including examples where the storage medium 910 is integral to the processing circuit 906 and/or examples where the storage medium 910 is separate from the processing circuit 906 (e.g., resident in the processing system 902, external to the processing system 902, distributed across multiple entities).

Programming stored by the storage medium 910, when executed by the processing circuit 906, can cause the processing circuit 906 to perform one or more of the various functions and/or process steps described herein. In at least some examples, the storage medium 910 may include DMRS operations 920. The DMRS operations 920 are generally adapted to cause the processing circuit 906 to generate and send a DMRS, as described herein. For example, the DMRS operations 920 may be adapted to cause the processing circuit 906 to obtain information for a transmission scheduled with pi/2 BPSK modulation, where the transmission includes two or more symbols scheduled for a DMRS. The DMRS operations 920 may further be adapted to cause the processing circuit 906 to identify a respective DMRS sequence for each of the two or more DMRS symbols, where each subsequent DMRS sequence is dependent on its immediately preceding DMRS sequence. The DMRS operations 920 may further be adapted to cause the processing circuit 906 to send the transmission including the identified respective DMRS sequence in each of the two or more DMRS symbols.

Thus, according to one or more aspects of the present disclosure, the processing circuit 906 is adapted to perform (independently or in conjunction with the storage medium 910) any or all of the processes, functions, steps and/or routines for any or all of the scheduled entities described herein (e.g., scheduled entity 106, UE 222, 224, 226, 228, 230, 232, 234, 236, 238, 240, and 242). As used herein, the term "adapted" in relation to the processing circuit 906 may refer to the processing circuit 906 being one or more of configured, employed, implemented, and/or programmed (in conjunction with the storage medium 910) to perform a particular process, function, step and/or routine according to various features described herein.

Figure 10:
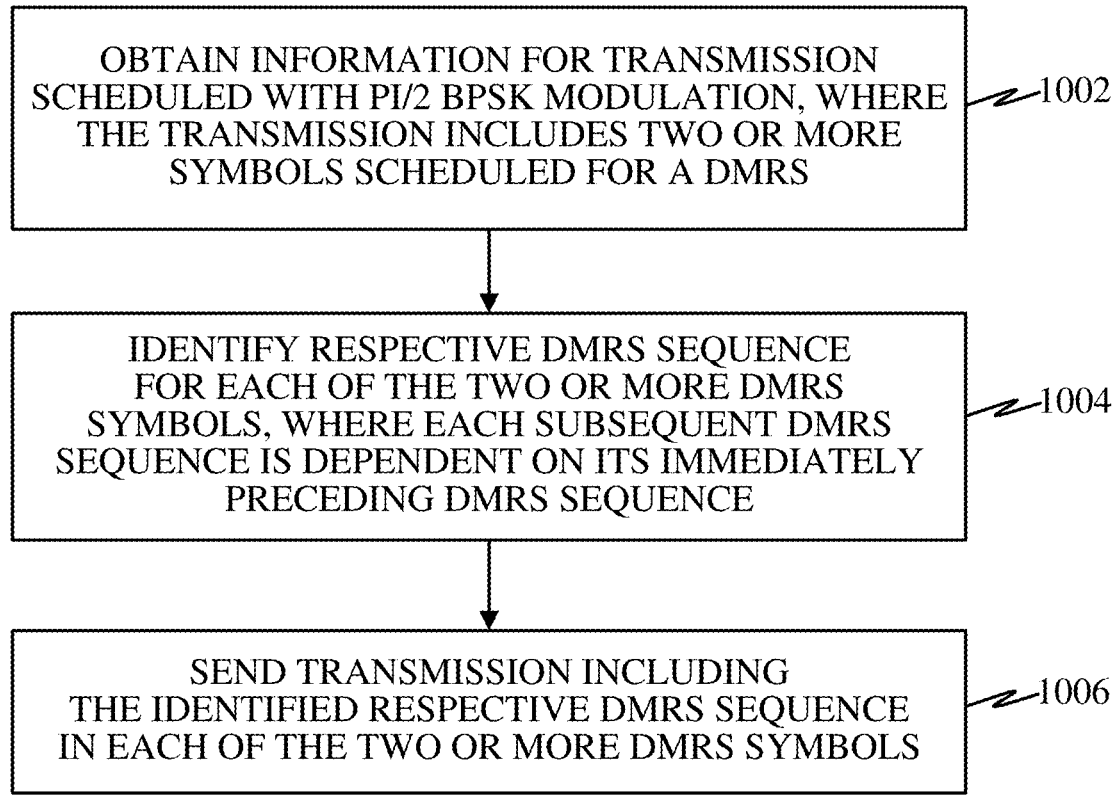
FIG. 10 is a flow diagram illustrating a wireless communication method (e.g., operational on or via a scheduled entity) according to at least one implementation of the present disclosure.

FIG. 10 is a flow diagram illustrating a wireless communication method (e.g., operational on or via a scheduled entity, such as the scheduled entity 900) according to at least one implementation of the present disclosure. As shown, the scheduled entity 900 may obtain information for a transmission scheduled with pi/2 BPSK modulation, where the transmission includes two or more symbols scheduled for a DMRS at operation 1002. For example, the processing system 902 may include logic (e.g., DMRS circuit/module 918 and/or DMRS operations 920) to obtain information for a transmission scheduled with pi/2 BPSK modulation. The uplink transmission may include two or more symbols scheduled for carrying a DMRS sequence, referred to as DMRS symbols.

At 1004, the scheduled entity 900 may identify a respective DMRS sequence for each of the two or more DMRS symbols, where each identified DMRS sequence that is transmitted subsequent to another DMRS sequence (e.g., subsequent to another DMRS symbol with a DMRS sequence) is dependent on its immediately preceding DMRS sequence. For example, the processing system 902 may include logic (e.g., DMRS circuit/module 918 and/or DMRS operations 920) to identify a respective DMRS sequence for each of the two or more DMRS symbols of the transmission, where each subsequent DMRS sequence is dependent on the immediately preceding DMRS sequence. In at least some implementations, each of the identified respective DMRS sequences may have a length less than 30.

In some examples, the processing system 902 may include logic (e.g., DMRS circuit/module 918 and/or DMRS operations 920) to utilize such a DMRS grouping table to identify a respective DMRS sequence for each of the two or more DMRS symbols of the transmission. In such examples, the scheduled entity 900 may receive the DMRS grouping table from the scheduling entity and/or may be (pre)provisioned with the DMRS grouping table to be utilized. As noted herein, the scheduled entity 900 may receive an indication from the scheduling entity of which DMRS sequence is to be used for the first DMRS symbol. Then the scheduled entity 900 can identify each subsequent DMRS sequence for each subsequence DMRS symbol according to the DMRS grouping table. As described above, a grouping table may be associated with a particular DMRS length and/or with a particular number of DMRS symbols.

In some examples, the scheduled entity 900 may identify a respective DMRS sequence for each of the two or more DMRS symbols utilizing a Gold sequence. For example, the processing system 902 may include logic (e.g., DMRS circuit/module 918 and/or DMRS operations 920) to generate or obtain a Gold sequence, and segment the Gold sequence into different segments. Each segment may have a length less than 30.

At 1006, the scheduled entity 900 can send the transmission including the identified respective DMRS sequence in each of the two or more DMRS symbols. For example, the processing system 902 may include logic (e.g., DMRS circuit/module 918 and/or DMRS operations 920) to transmit the transmission via the transceiver 914.

In some implementations, the transmission scheduled with pi/2 BPSK modulation may be scheduled to employ frequency hopping, with at least a first group of two or more DMRS symbols in a first frequency and at least a second group of two or more DMRS symbols in a second frequency, as described above with reference to FIG. 7. In such examples, identifying the respective DMRS sequence for each of the two or more DMRS symbols may include identifying a respective DMRS sequence for each of the two or more symbols scheduled for a DMRS in the first group, where each DMRS sequence subsequent to another DMRS sequence is dependent on its immediately preceding DMRS sequence in the first group. Furthermore, a respective DMRS sequence for the second group of two or more DMRS symbols in the second frequency may be identified, where a DMRS sequence for a first DMRS symbol in the second group is independent of any DMRS sequence for the first group, and where each subsequent DMRS sequence in the second group is dependent on its immediately preceding DMRS sequence in the second group.

In some implementations, the transmission scheduled with pi/2 BPSK modulation may be scheduled to employ transmission bundling, where the transmission may be repeated across multiple slots with a first group of two or more DMRS symbols in a first slot and a second group of two or more DMRS symbols in a second slot, as described above with reference to FIG. 8. In such examples, identifying the respective DMRS sequence for each of the two or more DMRS symbols may include identifying a respective DMRS sequence for the first group of two or more DMRS symbols in the first slot, where each subsequent DMRS sequence is dependent on its immediately preceding DMRS sequence for the first group of two or more DMRS symbols in the first slot. Furthermore, a respective DMRS sequence for the second group of two or more DMRS symbols in the second slot may be identified, where a DMRS sequence for a first DMRS symbol in the second group is dependent on a DMRS sequence for a last DMRS symbol of the first group, and where each subsequent DMRS sequence in the second group is dependent on its immediately preceding DMRS sequence in the second slot.

Figure 11:
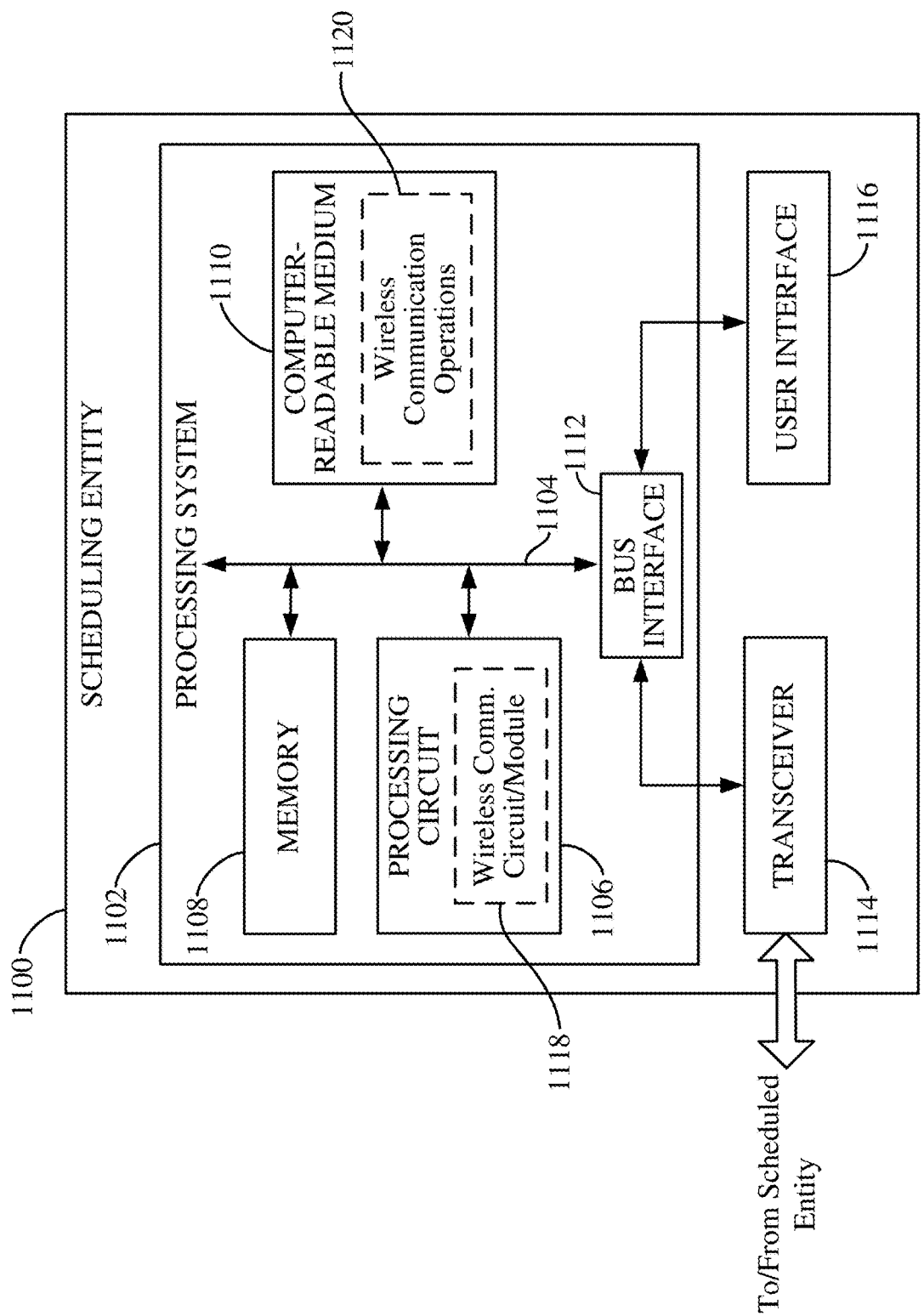
FIG. 11 is a block diagram illustrating select components of a scheduling entity according to at least one example.

Turning now to FIG. 11, a block diagram is shown illustrating select components of a scheduling entity 1100 employing a processing system 1102 according to at least one example of the present disclosure. Similar to the processing system 902 in FIG. 9, the processing system 1102 may be implemented with a bus architecture, represented generally by the bus 1104. The bus 1104 may include any number of interconnecting buses and bridges depending on the specific application of the processing system 1102 and the overall design constraints. The bus 1104 communicatively couples together various circuits including one or more processors (represented generally by the processing circuit 1106), a memory 1108, and computer-readable media (represented generally by the storage medium 1110). The bus 1104 may also link various other circuits such as timing sources, peripherals, voltage regulators, and power management circuits, which are well known in the art, and therefore, will not be described any further. A bus interface 1112 provides an interface between the bus 1104 and a transceiver 1114. The transceiver 1114 provides a means for communicating with various other apparatus over a transmission medium. For example, the transceiver 1114 may include a receive chain to receive one or more wireless signals, and/or a transmit chain to transmit one or more wireless signals. Depending upon the nature of the apparatus, a user interface 1116 (e.g., keypad, display, speaker, microphone, joystick) may also be provided.

The processing circuit 1106 is responsible for managing the bus 1104 and general processing, including the execution of programming stored on the computer-readable storage medium 1110. The programming, when executed by the processing circuit 1106, causes the processing system 1102 to perform the various functions described below for any particular apparatus. The computer-readable storage medium 1110 and the memory 1108 may also be used for storing data that is manipulated by the processing circuit 1106 when executing programming.

The processing circuit 1106 is arranged to obtain, process and/or send data, control data access and storage, issue commands, and control other desired operations. The processing circuit 1106 may include circuitry adapted to implement desired programming provided by appropriate media in at least one example, and/or circuitry adapted to perform one or more functions described in this disclosure. The processing circuit 1106 may be implemented and/or configured according to any of the examples of the processing circuit 906 described above.

In some instances, the processing circuit 1106 may include a wireless communication circuit and/or module 1118. The wireless communication circuit/module 1118 may include circuitry and/or programming (e.g., programming stored on the storage medium 1110) adapted to send a first transmission to schedule a second transmission from another wireless communication device with pi/2 BPSK modulation, where the second transmission is scheduled to include two or more symbols with a DMRS. The wireless communication circuit/module 1118 may further include circuitry and/or programming (e.g., programming stored on the storage medium 1110) adapted to receive the scheduled second transmission including the two or more DMRS symbols, where at least one DMRS symbol includes a DMRS sequence based on its immediately preceding DMRS sequence. As noted previously, reference to circuitry and/or programming may be generally referred to as logic (e.g., logic gates and/or data structure logic).

The storage medium 1110 may represent one or more computer-readable devices for storing programming, such as processor executable code or instructions (e.g., software, firmware), electronic data, databases, or other digital information. The storage medium 1110 may be configured and/or implemented in a manner similar to the storage medium 910 described above.

Programming stored by the storage medium 1110, when executed by the processing circuit 1106, can cause the processing circuit 1106 to perform one or more of the various functions and/or process steps described herein. In at least some examples, the storage medium 1110 may include wireless communication operations 1120 adapted to cause the processing circuit 1106 to send a first transmission to schedule a second transmission from another wireless communication device with pi/2 BPSK modulation, where the second transmission is scheduled to include two or more symbols with a DMRS. The wireless communication operations 1120 may further be adapted to cause the processing circuit 1106 to receive the scheduled second transmission including the two or more DMRS symbols, where at least one DMRS symbol includes a DMRS sequence based on its immediately preceding DMRS sequence.

Thus, according to one or more aspects of the present disclosure, the processing circuit 1106 is adapted to perform (independently or in conjunction with the storage medium 1110) any or all of the processes, functions, steps and/or routines for any or all of the scheduling entities described herein (e.g., scheduling entity 108, base station 210, 212, 214, 218, UE 238, quadcopter 220). As used herein, the term "adapted" in relation to the processing circuit 1106 may refer to the processing circuit 1106 being one or more of configured, employed, implemented, and/or programmed (in conjunction with the storage medium 1110) to perform a particular process, function, step and/or routine according to various features described herein.

Figure 12:
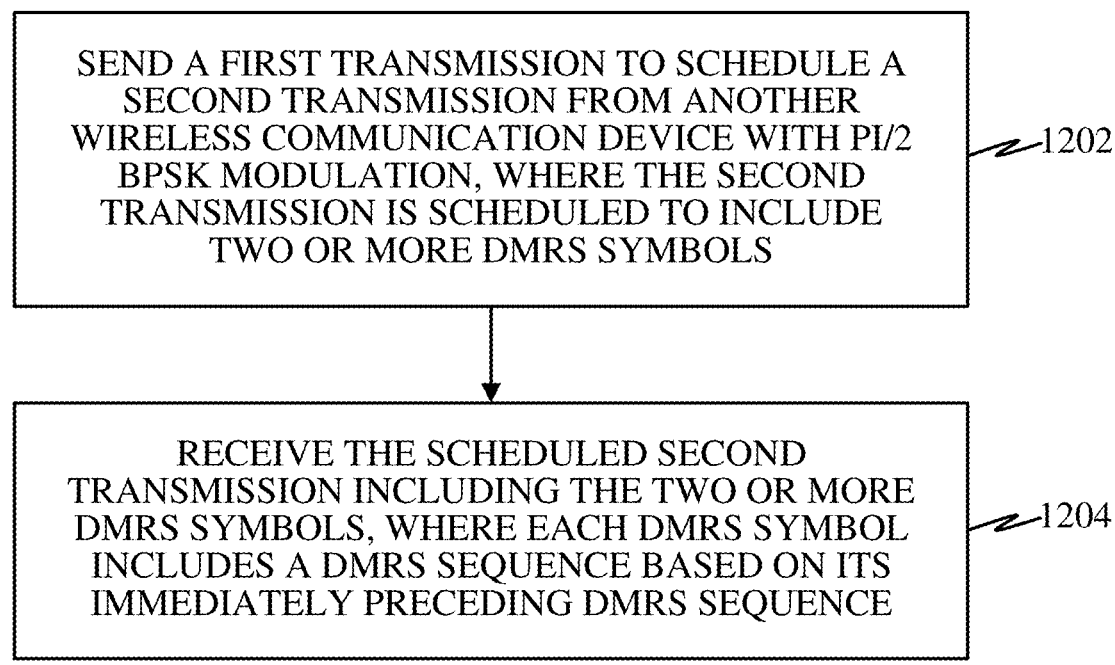
FIG. 12 is a flow diagram illustrating a wireless communication method (e.g., operational on or via a scheduling entity) according to at least one implementation of the present disclosure.

FIG. 12 is a flow diagram illustrating a wireless communication method (e.g., operational on or via a scheduling entity, such as the scheduling entity 1100) according to at least one implementation of the present disclosure. As shown, the scheduling entity 1100 may send a first transmission (e.g., downlink transmission), to schedule a second transmission (uplink transmission) from another wireless communication device (e.g., scheduled entity) with pi/2 BPSK modulation, where the second transmission is scheduled to include two or more symbols with a DMRS (e.g., DMRS symbols) at operation 1202. For example, the processing system 1102 may include logic (e.g., wireless communication circuit/module 1118 and/or wireless communication operations 1120) to send the first transmission via the transceiver 1114 to schedule the second transmission from the other wireless communication device with pi/2 BPSK modulation.

At 1204, the scheduling entity 1100 may receive the scheduled second transmission including the two or more DMRS symbols, where at least one DMRS symbol includes a DMRS sequence based on its immediately preceding DMRS sequence. For example, the processing system 1102 may include logic (e.g., wireless communication circuit/module 1118 and/or wireless communication operations 1120) to receive the scheduled second transmission via the transceiver 1114.

In some implementations, the DMRS sequence based on its immediately preceding DMRS sequence is defined by a grouping table that indicates a DMRS sequence for each subsequent DMRS symbol based on a DMRS sequence for any immediately preceding DMRS symbol. The processing system 1102 may, in some embodiments, include logic (e.g., wireless communication circuit/module 1118 and/or wireless communication operations 1120) to send the DMRS grouping table to the other wireless communication device via the transceiver 1114. As noted herein, the scheduling entity 1100 may send a sequence start indicator to the other wireless communication device, where the sequence start indicator identifies a starting sequence in the DMRS grouping table for a first DMRS symbol of the two or more DMRS symbols. As described above, a grouping table may be associated with a particular DMRS length and/or with a particular number of DMRS symbols.

In some implementations, the DMRS sequence based on its immediately preceding DMRS sequence may be defined by a Gold sequence. For instance, each of the two or more DMRS symbols may include a segment of a Gold sequence.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP or combinations of such systems. These systems may include candidates such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, and/or 12 may be rearranged and/or combined into a single component, step, feature or function or embodied in several components, steps, or functions. Additional elements, components, steps, and/or functions may also be added or not utilized without departing from the novel features of the present disclosure. The apparatus, devices and/or components illustrated in FIGS. 1, 2, 9, and/or 11 may be configured to perform or employ one or more of the methods, features, parameters, and/or steps described herein with reference to FIGS. 4, 5, 6, 7, 8, 9, and/or 12. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication, comprising:
   obtaining information for a transmission scheduled with pi/2 BPSK modulation, wherein the transmission includes two or more demodulation reference signal (DMRS) symbols;
   determining a plurality of DMRS sequences for the transmission, the plurality of DMRS sequences comprising a respective DMRS sequence for each DMRS symbol of the two or more DMRS symbols, wherein each DMRS sequence subsequent to another DMRS sequence of the plurality of DMRS sequences is dependent on its immediately preceding DMRS sequence, and wherein an initial DMRS sequence of the plurality of DMRS sequences is determined independently of any other respective DMRS sequence of the plurality of DMRS sequences; and
   sending the transmission including each respective DMRS sequence for each DMRS symbol of the two or more DMRS symbols.

2. The method of claim 1, wherein the two or more DMRS symbols each include a length less than 30.

3. The method of claim 2, wherein determining the plurality of DMRS sequences for the transmission comprises:
   determining the respective DMRS sequence for each DMRS symbol of the two or more DMRS symbols from a DMRS grouping table, wherein each DMRS sequence subsequent to another DMRS sequence in the DMRS grouping table is dependent on its immediately preceding DMRS sequence.

4. The method of claim 3, wherein the DMRS grouping table is associated with a particular number of DMRS symbols.

5. The method of claim 1, wherein:
   determining the plurality of DMRS sequences for the transmission comprises:
     generating a Gold sequence;
     segmenting the generated Gold sequence into different segments; and
   sending the transmission comprises sending each segment of the Gold sequence in different DMRS symbols.

6. The method of claim 5, wherein each segment of the Gold sequence includes a length less than 30.

7. The method of claim 1, wherein:
   the transmission scheduled with pi/2 BPSK modulation is further scheduled to employ frequency hopping, including a first group of two or more DMRS symbols in a first frequency and a second group of two or more DMRS symbols in a second frequency; and
   determining the plurality of DMRS sequences for the transmission comprises:
     determining a first respective DMRS sequence for each DMRS symbol of the two or more DMRS symbols in the first group, wherein each DMRS sequence subsequent to another DMRS sequence is dependent on its immediately preceding DMRS sequence in the first group, and
     determining a second respective DMRS sequence for each DMRS symbol of the two or more DMRS symbols in the second group, wherein a DMRS sequence for a first DMRS symbol in the second group is independent of any DMRS sequence for the first group, and wherein each DMRS sequence in the second group subsequent to another DMRS sequence in the second group is dependent on its immediately preceding DMRS sequence in the second group.

8. The method of claim 1, wherein:
   the transmission scheduled with pi/2 BPSK modulation is further scheduled to employ transmission bundling including repeating the transmission across multiple slots with a first group of two or more symbols scheduled for a DMRS in a first slot and a second group of two or more DMRS symbols in a second slot; and
   determining the plurality of DMRS sequences for the transmission comprises:
     determining a first respective DMRS sequence for each DMRS symbol of the two or more DMRS symbols in the first group, wherein each DMRS sequence subsequent to another DMRS sequence is dependent on its immediately preceding DMRS sequence in the first group, and
     determining a second respective DMRS sequence for each DMRS symbol of the two or more DMRS symbols in the second group, wherein a DMRS sequence for a first DMRS symbol in the second group is dependent on a DMRS sequence for a last DMRS symbol of the first group, and wherein each DMRS sequence in the second group subsequent to another DMRS sequence in the second group is dependent on its immediately preceding DMRS sequence in the second group.

9. The method of claim 1, wherein:
the determining the plurality of DMRS sequences for the transmission comprises determining the respective DMRS sequence for each DMRS symbol of the two or more DMRS symbols from a first DMRS grouping table of a plurality of DMRS grouping tables;
the first DMRS grouping table is for a first quantity of DMRS symbols; and
a second DMRS grouping table of the plurality of DMRS grouping tables is for a second quantity of DMRS symbols that is different from the first quantity of DMRS symbols.

10. A wireless communication device, comprising:
a transceiver;
a memory; and
a processing circuit communicatively coupled to the transceiver and the memory, the processing circuit and the memory configured to:
obtain information for a transmission scheduled with pi/2 BPSK modulation, wherein the transmission includes two or more symbols scheduled for a demodulation reference signal (DMRS),
determine a plurality of DMRS sequences for the transmission, the plurality of DMRS sequences comprising a respective DMRS sequence for each symbol of the two or more symbols scheduled for a DMRS, wherein each DMRS sequence subsequent to another DMRS sequence of the plurality of DMRS sequences is dependent on its immediately preceding DMRS sequence, and wherein an initial DMRS sequence of the plurality of DMRS sequences is determined independently of any other respective DMRS sequence of the plurality of DMRS sequences, and
transmit, via the transceiver, the transmission including each respective DMRS sequence for each DMRS symbol of the two or more symbols scheduled for the DMRS.

11. The wireless communication device of claim 10, wherein the two or more symbols scheduled for a DMRS each include a length less than 30.

12. The wireless communication device of claim 11, wherein the determining the plurality of DMRS sequences for the transmission comprises:
determining the respective DMRS sequence for each symbol of the two or more symbols scheduled for the DMRS from a DMRS grouping table, wherein each DMRS sequence subsequent to another DMRS sequence in the DMRS grouping table is dependent on its immediately preceding DMRS sequence.

13. The wireless communication device of claim 12, wherein the DMRS grouping table is associated with a particular DMRS length.

14. The wireless communication device of claim 12, wherein the DMRS grouping table is associated with a particular number of symbols scheduled for a DMRS.

15. The wireless communication device of claim 10, wherein:
the determining the plurality of DMRS sequences for the transmission comprises generating a Gold sequence, and segmenting the generated Gold sequence into different segments; and
the transmitting the transmission including each respective DMRS sequence for each DMRS symbol of the two or more symbols scheduled for the DMRS comprises transmitting each segment of the Gold sequence in different symbols scheduled for a DMRS.

16. The wireless communication device of claim 10, wherein the transmission scheduled with pi/2 BPSK modulation is further scheduled to employ frequency hopping, including a first group of two or more symbols scheduled for a DMRS in a first frequency and a second group of two or more symbols scheduled for a DMRS in a second frequency; and wherein the plurality of DMRS sequences for the transmission comprises:
determining a first respective DMRS sequence for each symbol of the two or more symbols scheduled for a DMRS in the first group, wherein each DMRS sequence subsequent to another DMRS sequence is dependent on its immediately preceding DMRS sequence in the first group; and
determining a second respective DMRS sequence for each symbol of the two or more symbols scheduled for a DMRS in the second group, wherein a DMRS sequence for a first symbol scheduled for a DMRS in the second group is independent of any DMRS sequence for the first group, and wherein each DMRS sequence in the second group subsequent to another DMRS sequence in the second group is dependent on its immediately preceding DMRS sequence in the second group.

17. The wireless communication device of claim 10, wherein the transmission scheduled with pi/2 BPSK modulation is further scheduled to employ transmission bundling including repeating the transmission across multiple slots with a first group of two or more symbols scheduled for a DMRS in a first slot and a second group of two or more symbols scheduled for a DMRS in a second slot; and wherein the plurality of DMRS sequences for the transmission comprises:
determining a first respective DMRS sequence for each symbol of the two or more symbols scheduled for a DMRS in the first group, wherein each DMRS sequence subsequent to another DMRS sequence is dependent on its immediately preceding DMRS sequence in the first group; and
determining a second respective DMRS sequence for each symbol of the two or more symbols scheduled for a DMRS in the second group, wherein a DMRS sequence for a first symbol scheduled for a DMRS in the second group is dependent on a DMRS sequence for a last symbol scheduled for a DMRS of the first group, and wherein each DMRS sequence in the second group subsequent to another DMRS sequence in the second group is dependent on its immediately preceding DMRS sequence in the second group.

18. A method of wireless communication at a first wireless communication device, comprising:
sending a first transmission to schedule a second transmission from a second wireless communication device with pi/2 BPSK modulation, wherein the second transmission is scheduled to include two or more demodulation reference signal (DMRS) symbols; and
receiving the scheduled second transmission including the two or more DMRS symbols, wherein at least one DMRS symbol of the two or more DMRS symbols includes a DMRS sequence based on its immediately preceding DMRS sequence, and wherein a first DMRS symbol of the two or more DMRS symbols includes a DMRS sequence that is determined independently of any other DMRS sequence of the two or more DMRS symbols.

19. The method of claim 18, wherein the DMRS sequence based on its immediately preceding DMRS sequence is defined by a DMRS grouping table that indicates a respective DMRS sequence for each subsequent DMRS symbol based on a corresponding DMRS sequence for any immediately preceding DMRS symbol.

20. The method of claim 19, further comprising:
sending the DMRS grouping table to the second wireless communication device.

21. The method of claim 19, further comprising:
sending a sequence start indicator to the second wireless communication device, the sequence start indicator configured to identify a starting sequence in the DMRS grouping table for the first DMRS symbol of the two or more DMRS symbols.

22. The method of claim 19, wherein the DMRS grouping table is associated with a particular DMRS length.

23. The method of claim 19, wherein the DMRS grouping table is associated with a particular number of DMRS symbols.

24. The method of claim 18, wherein each DMRS symbol of the two or more DMRS symbols includes a segment of a Gold sequence.

25. A first wireless communication device, comprising:
a transceiver;
a memory; and
a processing circuit communicatively coupled to the transceiver and the memory, the processing circuit and the memory configured to:
send a first transmission via the transceiver to schedule a second transmission from a second wireless communication device with pi/2 BPSK modulation, wherein the second transmission is scheduled to include two or more symbols with a demodulation reference signal (DMRS), and
receive the scheduled second transmission including the two or more symbols scheduled for a DMRS, wherein at least one symbol of the two or more DMRS symbols includes a DMRS sequence based on its immediately preceding DMRS sequence, and wherein a first DMRS symbol of the two or more DMRS symbols includes a DMRS sequence that is determined independently of any other DMRS sequence of the two or more symbols.

26. The first wireless communication device of claim 25, wherein the DMRS sequence based on its immediately preceding DMRS sequence is defined by a grouping table that indicates a respective DMRS sequence for each subsequent symbol scheduled for a DMRS based on a corresponding DMRS sequence for any immediately preceding symbol scheduled for a DMRS.

27. The first wireless communication device of claim 26, wherein the processing circuit and the memory are further configured to:
send the grouping table to the second wireless communication device.

28. The first wireless communication device of claim 26, wherein the processing circuit and the memory are further configured to:
send a sequence start indicator to the second wireless communication device, the sequence start indicator configured to identify a starting sequence in the grouping table for the first symbol of the two or more symbols.

29. The first wireless communication device of claim 26, wherein the grouping table is associated with at least one of a particular DMRS length or a particular number of symbols scheduled for a DMRS.

30. The first wireless communication device of claim 25, wherein each symbol of the two or more symbols scheduled for a DMRS includes a segment of a Gold sequence.

* * * * *